March 31, 1964   V. W. HAMPTON ETAL   3,126,839
RAILED TRANSPORT MEANS OR SYSTEMS
Filed July 23, 1962
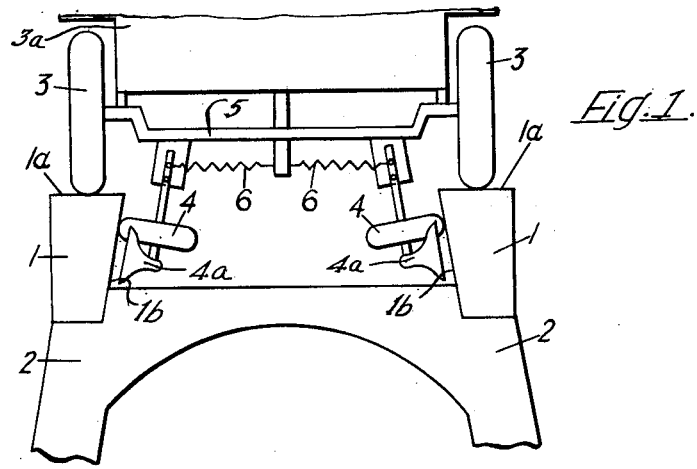
Fig. 1.
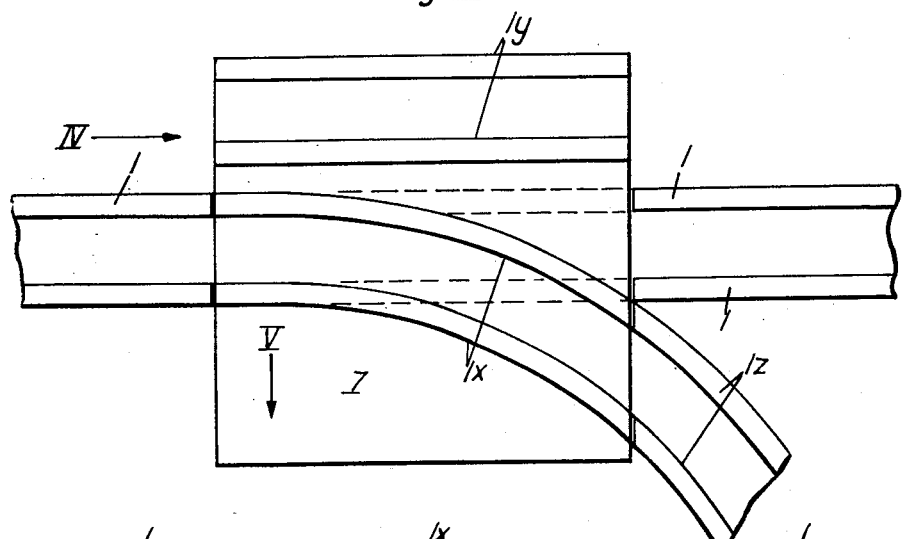
Fig. 2.
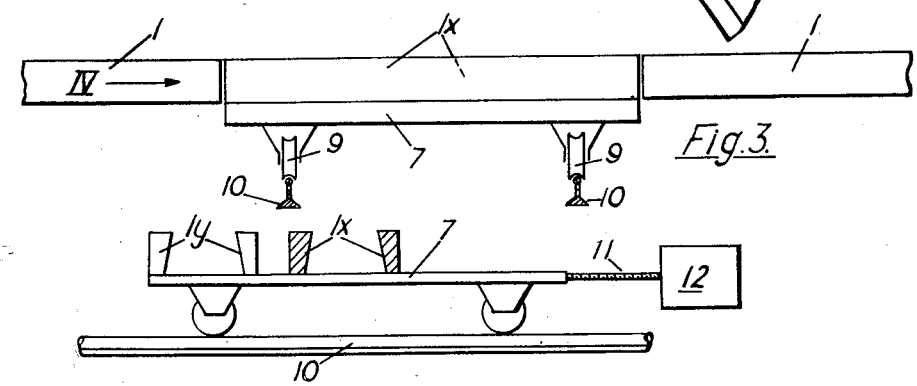
Fig. 3.
Fig. 4.

United States Patent Office 3,126,839
Patented Mar. 31, 1964

3,126,839
RAILED TRANSPORT MEANS OR SYSTEMS
Verner William Hampton, Thomas Alfred Johnson, and Norman Henry Francis Renwick, Salisbury, Southern Rhodesia, Federation of Rhodesia and Nyasaland, and George Douglas Green, South Devon, England, assignors to Pneuways Development Company (Private) Limited, Salisbury, Southern Rhodesia, Federation of Rhodesia and Nyasaland
Filed July 23, 1962, Ser. No. 211,784
Claims priority, application Federation of Rhodesia and Nyasaland Feb. 22, 1962
9 Claims. (Cl. 104—247)

This invention relates to railed transport systems or means of the kind referred to in applications Serial No. 26,611, filed May 3, 1960; Serial No. 127,452, filed July 25, 1961, and Serial No. 127,463, filed July 25, 1961, and others and more particularly comprising twin tracks and vehicles with flangeless wheels for running thereon under lateral guidance along them obtained by reaction from corresponding side surfaces of two beams lying respectively in planes which are inclined in opposite senses to the general plane of the track surface defined by the twin beams, whereby the resultant of such reaction additionally stabilizes the vehicle against forces tending to topple it laterally in either direction from the track. The reaction aforesaid, which is a characteristic and an important safety feature of our earlier inventions, is obtained in the present invention, as in said earlier inventions, through guide wheels which, associated with the vehicle running or load-carrying wheels, are arranged to engage resiliently and with adjustable grip if desired, on said corresponding side surfaces of the two beams; and there may be associated with such guide wheels means whereby the reaction aforementioned of the guide wheels may be augmented and even, e.g. above high vehicle speeds, replaced by compressed air jets directed against the inclined surfaces of the respective beams.

According to this invention, in a transport system as described above, the reaction and its resultant for the guidance and stabilisation of the vehicle is derived from the mutually opposed inner side surfaces of the respective track beams, which surfaces are arranged to converge upwardly, the guide wheels (and if provided the compressed air jet means) being located between the load-carrying or running wheels of the vehicle and under the associated wheel bogies so as to cooperate outwardly with said inner side beam surfaces.

The guide wheels are furthermore arranged, when in outward contact with the respective beam inner sides, with their planes of rotation substantially normal to the slopping planes containing said respective sides.

Whereas, as in specific examples appearing in specifications of our aforementioned earlier inventions, a track switching means is devised to suit a system in which the vehicle guide wheels (and compressed air jet means if provided) are arranged to cooperate with upwardly diverging opposite outer sides of the respective beams, such means does not lend itself to use with the invention which is defined in the immediately preceding two paragraphs herein.

The present invention accordingly also comprises a track switch associated with a main track and broadly consisting of a number of sections of functionally similar twin tracks carried on a common supporting member moveable transversely of such main track so as to enable the twin beams of any one of such sections, by an appropriate positioning of said member, to be connected in operative continuity with corresponding beams of the main track, one such section when so positioned being devised to complete the continuity of the main track, and another such section when in that position connecting the main track with a branch or loop track.

Conveniently the switch section-supporting member is in the nature of a parallel ended platform supported for its required translatory movements by roller and beam means and moveable between the selected operative positions manually or under power.

Examples of how the invention may be carried into effect are now described with reference to the accompanying semi-diagrammatic drawings, wherein:

FIGURE 1 is a cross-section of the twin beamed track showing how a vehicle cooperates therewith;

FIGURE 2 is a plan of a simple form of switch between a main track and a loop or branch;

FIGURE 3 is an elevation on one side of the switch; and

FIGURE 4 is an elevation of the switch, looking in the direction of arrows IV in FIGURES 2 and 3.

In these drawings the beams 1 comprising the twin track are concrete or other beams and of the uniform flat-sided cross-section shown, which are supported in parallelism and desired track widths at suitable height above ground by portal frames as 2 in FIGURE 1, or by other suitable means.

The flat top sides 1a of the beams provide the tracks proper for running surfaces on which the, preferably pneumatic tyred, flangeless load-carrying wheels 3 of the vehicle 3a run, and the flat opposing inner side surfaces 1b of said beams converge upwardly.

Guide wheels 4, preferably also pneumatic tyred, articulatively supported under and from the bogie frame which is indicated generally by reference 5, are thrust outwardly in opposite directions as by tension springs 6 (pneumatically, hydraulically or otherwise) into running contact with the beam surfaces 1b, being so arranged and mounted as then to run with their planes of rotation substantially normal to these flat inclined surfaces 1b, as shown.

The vehicle shown in FIGURE 1 comprises also the pads 4a associated with the guide wheels 4 for direction of air jets at the same surfaces 1b of the track-forming beams.

The convergent relationship of the surfaces 1b, coupled with the outward thrust exerted resiliently on them by the guide wheels or by the air jets acts to rstrain or damp the vehicle against bouncing, pitching, swaying or lateral tilting movements; in addition to the function of the guide wheels or air jets in maintaining the vehicle centrally and securely on the track when in motion along it.

In FIGURES 2, 3 and 4 showing the switch, the main track of beams 1 is parted transversely. The switch construction comprises the platform 7 moveable either way across the main track and supporting two separate sections 1x and 1y of beams, whereof those marked 1x curve outwardly over the platform and when in the position in which they are shown in FIGURE 2, connect the main track with and become part of a loop or branch track which is indicated by reference 1z. When the platform is moved in the direction of arrow V to bring the section 1y into the dotted line position, this section restores continuity of the main track, with the section 1x displaced laterally into an inoperative position unconnected with the track 1z.

The arrangement of the track sections on the platform 7 is apparent from FIGURES 3 and 4 which also illustrate the convenient method of supporting the platform 7 and moving it on wheels as 9 and rails as 10 as by lead screw means 11 operative from a drive mechanism, indicated generally by reference 12, suitably mounted in a fixed position in relation to the stationary track and structure supporting the platform-carrying rails 10.

We claim:

1. In a transport system a running track presented by upper surfaces of twin parallel track-forming beams in a mutually spaced relation on support means, said track being suitable for flangeless wheels and said beams having a cross-section presenting side surfaces inclined to the track-presenting upper surfaces and upwardly convergent therebetween; and a vehicle having load-carrying wheels to run on said track, a body supported by said wheels above said track and guide wheels oppositely mounted under said body for guiding and stabilizing the vehicle on the track by exerting outward resilient grip on said upwardly convergent side surfaces of the beams.

2. In a transport system as claimed in claim 1 said vehicle body being supported by a bogie comprising said load-carrying wheels and said guide wheels being located under said bogie and arranged for engaging the convergent beam surfaces in planes of rotation substantially normal thereto.

3. In a transport system as claimed in claim 1 said vehicle having associated with said guide wheels means for directing compressed air jets outwardly and oppositely at said convergent beam surfaces.

4. In a transport system as claimed in claim 1 a switch included in the running track, comprising a plurality of sections of the twin track-forming beams supported in laterally spaced relation on a common platform, means for moving said platform transversely of the track to align either one of said sections in operative continuity with the remainder of the running track lying on both sides of said platform.

5. In a transport system as claimed in claim 4 rails arranged transversely of the running track on a stationary supporting structure, said platform of the switch being supported on said rails by wheels, and means for moving the platform along the rails.

6. In a transport system as claimed in claim 5 said platform-moving means comprising a lead screw operative from drive mechanism fixed to the rail-supporting structure.

7. In a transport system as claimed in claim 1 each track-forming beam being of trapezoidal cross-section having two adjacent sides containing an angle substantially less than a right angle and respectively presenting the track surface and the guide wheels-engageable side surface of the beam.

8. In a transport system as claimed in claim 2 said guide wheels being articulatively supported under said bogie and means being provided for thrusting said wheels outwardly and oppositely about the respective articulations.

9. In a transport system as claimed in claim 8 said guide wheel-thrusting means comprising springs.

References Cited in the file of this patent

UNITED STATES PATENTS

| | | |
|---|---|---|
| 224,157 | Donkersley | Feb. 3, 1880 |
| 1,411,597 | Trask | Apr. 4, 1922 |
| 1,432,104 | Feucht | Oct. 17, 1922 |
| 1,453,024 | Ryon | Apr. 24, 1923 |
| 3,055,312 | Jay et al. | Sept. 25, 1962 |